United States Patent
Morrison et al.

(10) Patent No.: US 8,616,801 B2
(45) Date of Patent: Dec. 31, 2013

(54) GUSSET WITH FIBERS ORIENTED TO STRENGTHEN A CMC WALL INTERSECTION ANISOTROPICALLY

(75) Inventors: Jay A. Morrison, Oviedo, FL (US); John V. Stewart, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 176 days.

(21) Appl. No.: 12/769,964

(22) Filed: Apr. 29, 2010

(65) Prior Publication Data
US 2011/0265406 A1  Nov. 3, 2011

(51) Int. Cl.
F16B 17/00 (2006.01)

(52) U.S. Cl.
USPC ............ 403/231; 403/205; 403/382; 403/403

(58) Field of Classification Search
USPC ............... 403/205, 231, 382, 403; 248/220.1; 52/272, 282.3, 708
See application file for complete search history.

(56) References Cited

U.S. PATENT DOCUMENTS

| | | | | |
|---|---|---|---|---|
| 2,520,231 | A | * | 8/1950 | Anderson ..................... 403/231 |
| 2,657,439 | A | * | 11/1953 | Levine ......................... 403/231 |
| 3,914,062 | A | * | 10/1975 | Heininger .................... 403/231 |
| 4,071,301 | A | * | 1/1978 | Pritchard ...................... 403/231 |
| 4,626,461 | A | | 12/1986 | Prewo et al. |
| 4,704,332 | A | | 11/1987 | Brennan et al. |
| 5,348,056 | A | | 9/1994 | Tsuzuki |
| 5,382,453 | A | | 1/1995 | Mason |
| 6,013,592 | A | | 1/2000 | Merrill et al. |
| 6,200,092 | B1 | | 3/2001 | Koschier |
| 6,390,724 | B1 | * | 5/2002 | Thoms et al. ................. 403/402 |
| 6,471,434 | B2 | * | 10/2002 | Chin et al. .................... 403/175 |
| 6,648,597 | B1 | | 11/2003 | Widrig et al. |
| 6,682,256 | B1 | * | 1/2004 | Hor .............................. 403/382 |
| 6,733,907 | B2 | | 5/2004 | Morrison et al. |
| 6,758,653 | B2 | | 7/2004 | Morrison |
| 7,093,359 | B2 | | 8/2006 | Morrison et al. |
| 7,559,180 | B2 | * | 7/2009 | Ajiki ............................ 52/655.1 |
| 7,600,979 | B2 | * | 10/2009 | Steibel et al. ................. 416/230 |
| 2005/0254942 | A1 | * | 11/2005 | Morrison et al. ............ 415/200 |
| 2008/0087021 | A1 | | 4/2008 | Radonovich et al. |

* cited by examiner

*Primary Examiner* — Daniel P. Stodola
*Assistant Examiner* — Jonathan Masinick

(57) ABSTRACT

A gusset (40A-G) between two CMC walls (26, 28) has fibers (23) oriented to provide anisotropic strengthening of the wall intersection (34). The fibers (23) may be oriented diagonally to oppose in tension a wall-spreading moment of the walls (26, 28) about the intersection (34). Interlocking features (46, 48, 52, 56, 58) may be provided on the gusset to improve load sharing between the gusset and the walls. The gusset may have one or more diagonal edges (50, 51) that contact matching edges of a slot (42, 42D, 43D) to oppose wall-spreading (M1) and wall-closing (M2) bending of the walls (26, 28). The gusset may be installed in the slot after preparing the gusset and the walls to different temperatures. Then the assembly may be final-fired to produce differential shrinkage that causes compression of the gusset or the wall intersection.

13 Claims, 6 Drawing Sheets

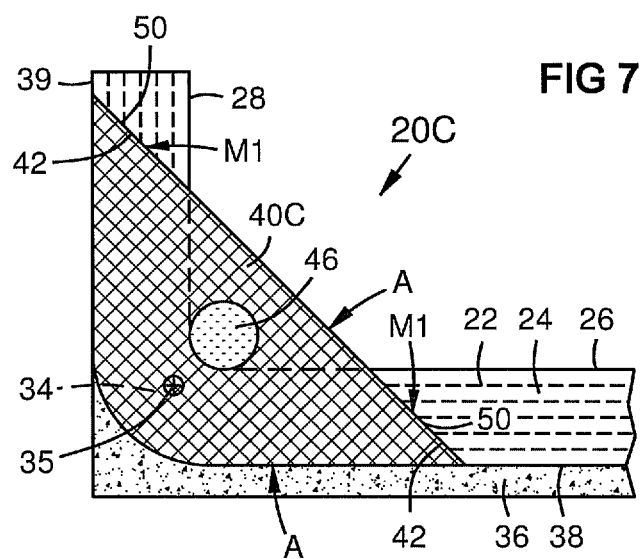
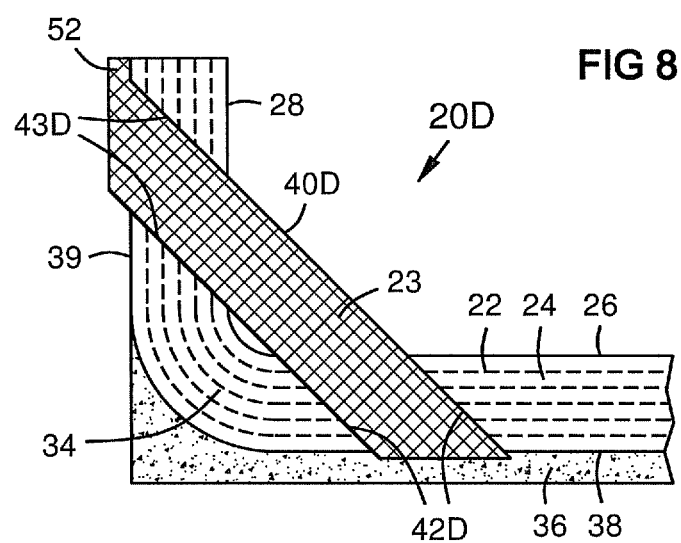

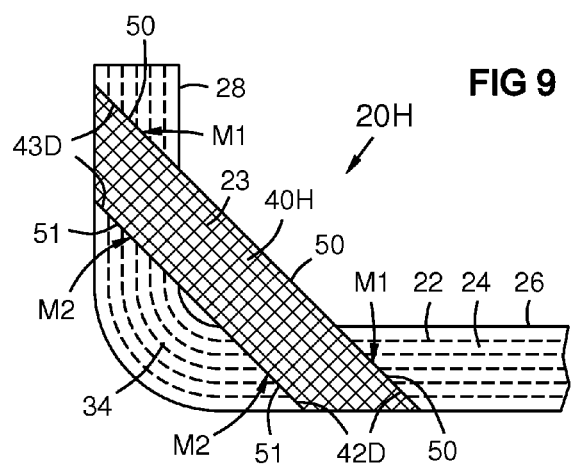
FIG 9
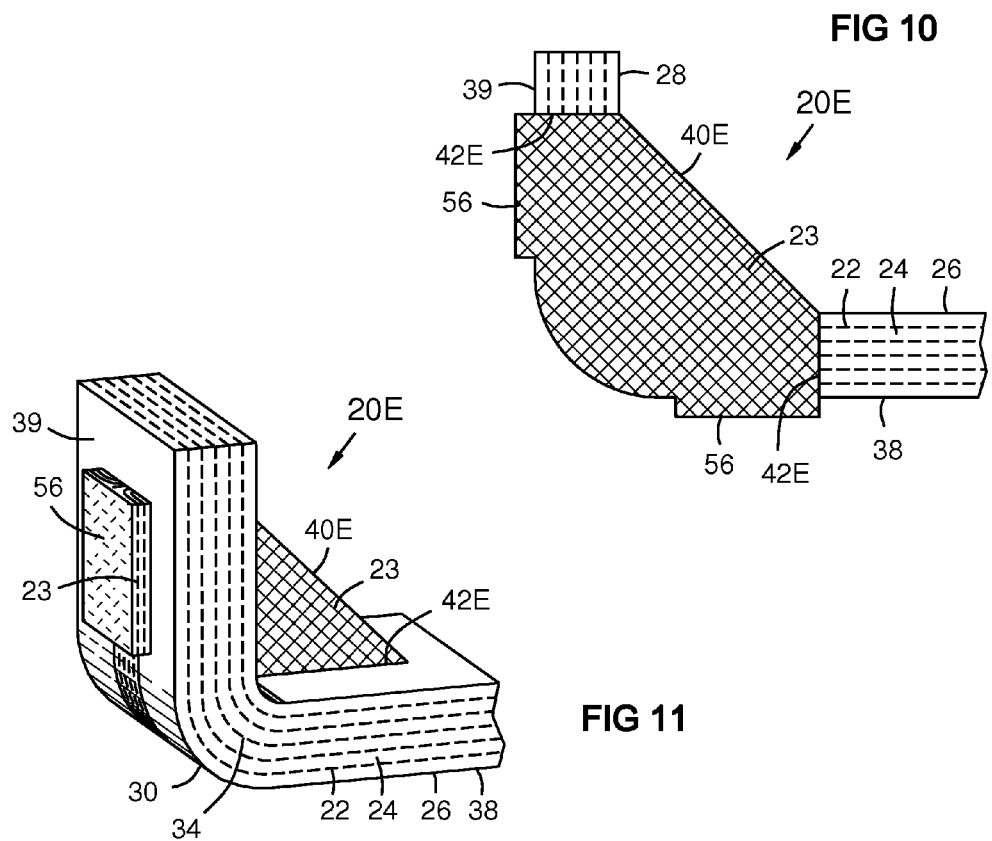
FIG 10
FIG 11

GUSSET WITH FIBERS ORIENTED TO STRENGTHEN A CMC WALL INTERSECTION ANISOTROPICALLY

FIELD OF THE INVENTION

This invention relates to ceramic matrix composite (CMC) structures with load-bearing CMC wall intersections, and particularly to means for strengthening such wall intersections against wall-spreading and wall closing moments of bending.

BACKGROUND OF THE INVENTION

Gussets have been used in metal components such as brackets to strengthen wall intersections. Providing gussets in load-bearing CMC wall intersections is difficult compared to metal. Ceramic matrix composites (CMC) are used for components in high temperature environments, such in gas turbine engines. CMC is formed by combining ceramic fibers with a ceramic matrix, and heating the combined material to a sintering temperature. The fibers add tensile strength in the directions of the fibers. The resulting material has a higher operating temperature range than metal, and can be optimized for strength by fiber orientations and layering.

CMC laminate fabrication from ceramic 2D broadloom fabrics is a standard industry practice. For such laminates, a limiting aspect is the interlaminar tensile and shear strength of the material. This is especially true for load-bearing structures, wherein loads are reacted through CMC wall intersections or flanges. CMC wall intersections tend to delaminate under cyclic mechanical and thermal stresses encountered in gas turbines.

BRIEF DESCRIPTION OF THE DRAWINGS

The invention is explained in the following description in view of the drawings that show:

FIG. 7 is a side sectional view of an embodiment with a pin, and without tabs.

FIG. 8 is a side sectional view of an embodiment with a gusset plate that does not cut through the wall intersection.

FIG. 9 is a side sectional view of an embodiment as in FIG. 9 without a tab.

FIG. 10 is a side sectional view of an embodiment with tabs formed by spreading the gusset plate fibers.

FIG. 11 is a sectional perspective view of the embodiment of FIG. 10.

DETAILED DESCRIPTION OF THE INVENTION

The invention teaches CMC gussets containing fibers that are discontinuous with the fibers of the first and second CMC walls, and are oriented to provide anisotropic strengthening to the intersection between the walls. Means for interlocking the gussets with the CMC wall structure for improved load transfer are described herein.

Figure 1:
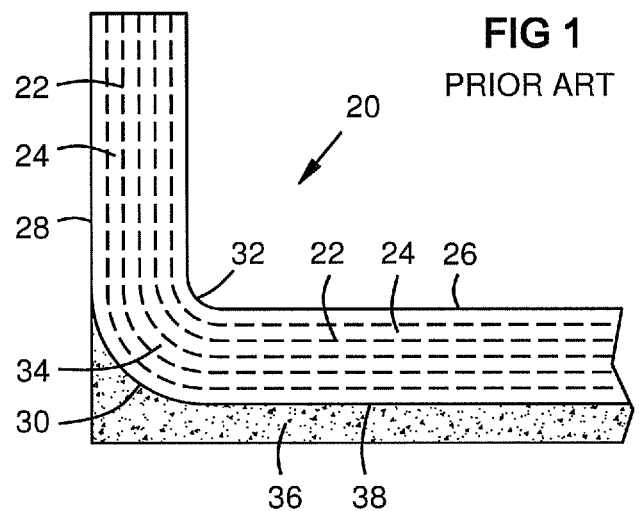
FIG. 1 is a side sectional view of a prior art CMC structure.

FIG. 1 illustrates a prior art CMC structure 20, with ceramic fibers or fabric 22 impregnated with a ceramic matrix 24, forming a first wall 26 and a second wall 28. The two walls are joined at an intersection 34 with a rounded outer edge 30 and an inside fillet 32. Relative bending moments between the two walls 26, 28 concentrate stresses in the intersection 34, which tends to separate the fiber/matrix layers therein. In some gas turbine components, a ceramic thermal insulation layer 36 is applied to an outer surface 38 of a wall. For descriptive purposes, the vertical wall 28 will be considered a front wall herein.

Figure 2:
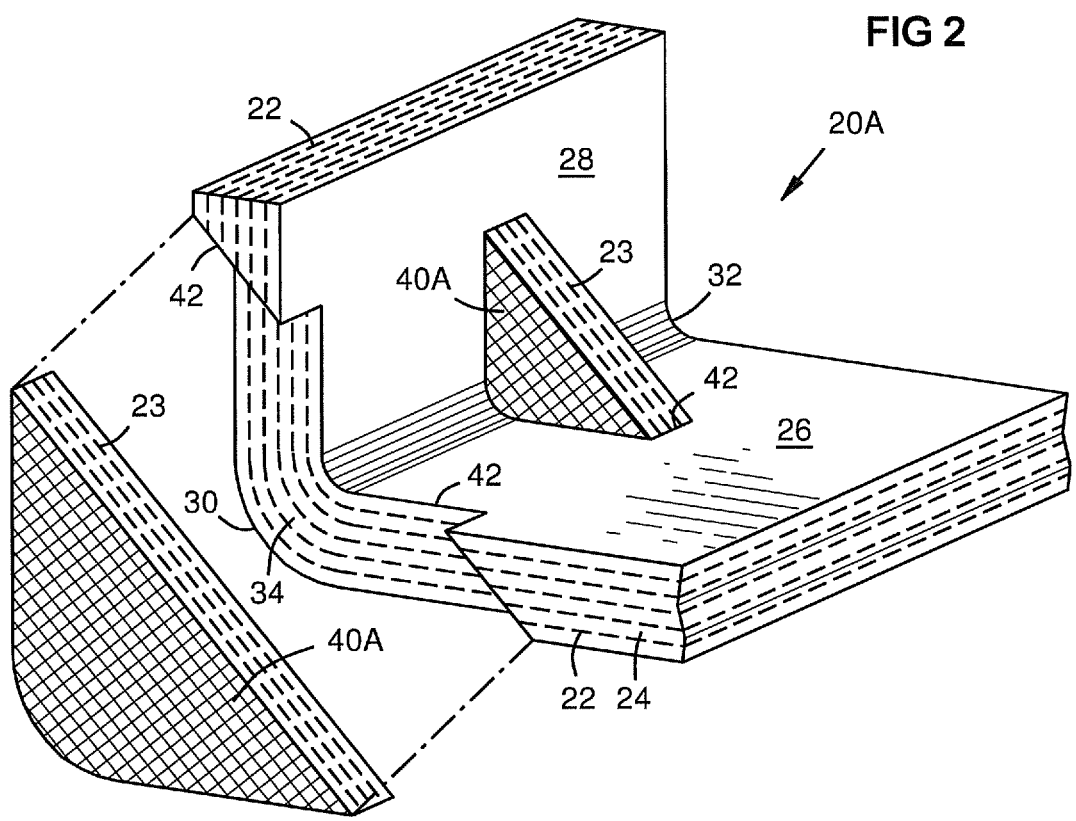
FIG. 2 is a sectional perspective view of a CMC structure according to aspects of the invention.

FIG. 2 is a sectional perspective view of a CMC structure 20A according to aspects of the invention. A gusset plate 40A is inserted into a slot 42 across the intersection 34. The gusset plate may be substantially orthogonal to both walls 26, 28, and includes ceramic fibers 23, at least some of which are oriented diagonally between the walls 26, 28 as shown. A diagonal fiber orientation maximizes tensile strength of the gusset in opposing separation of the walls 26, 28. Herein "diagonal" means an angle between 30-60 degrees with respect to each wall—especially 45 degrees relative to both walls. For example, the fibers may be oriented 50 degrees relative to one wall and 40 degrees relative to the other wall. The fibers 23 of the gusset plate 40A are discontinuous with the fibers 22 of the walls 26, 28.

Figure 3:
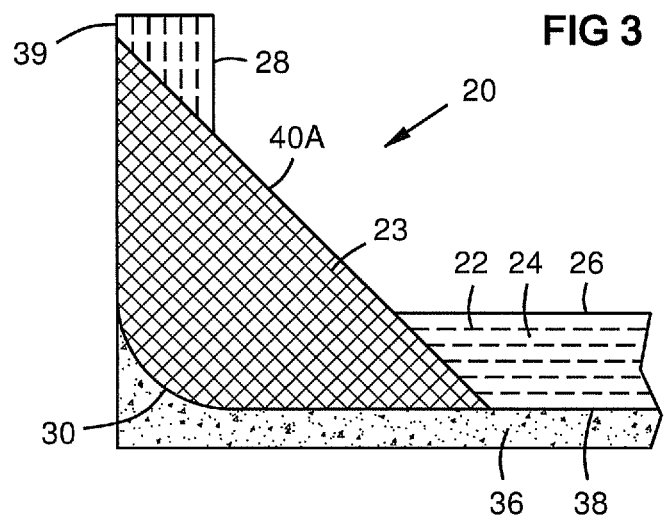
FIG. 3 is a side sectional view of the embodiment of FIG. 2 with an insulation layer added.

In this embodiment, the walls 26, 28 and the gusset plate 40A may be formed separately. The walls 26, 28 may be prepared to a green-body or bisque-fired state, and the slots 42 may then be machined into the walls. Alternately, the slots 42 may be formed by a fugitive insert in the lay-up of the walls, and then removed after bisque firing. The gusset plate 40A may also be prepared to a green-body or bisque-fired state, then inserted into the slot 42. The walls 26, 28, and gusset plate 40A may then be co-fired to a final bonded state. Optionally, the gusset plate may be fired to a higher temperature than the wall structure 26, 28 before insertion, such that the walls 26, 28 shrink onto the gusset plate 40A in final firing, producing a pre-compression that reduces the chance of bond separation. FIG. 3 shows a side sectional view of the embodiment of FIG. 2 with an added insulation layer 38.

Figure 4:
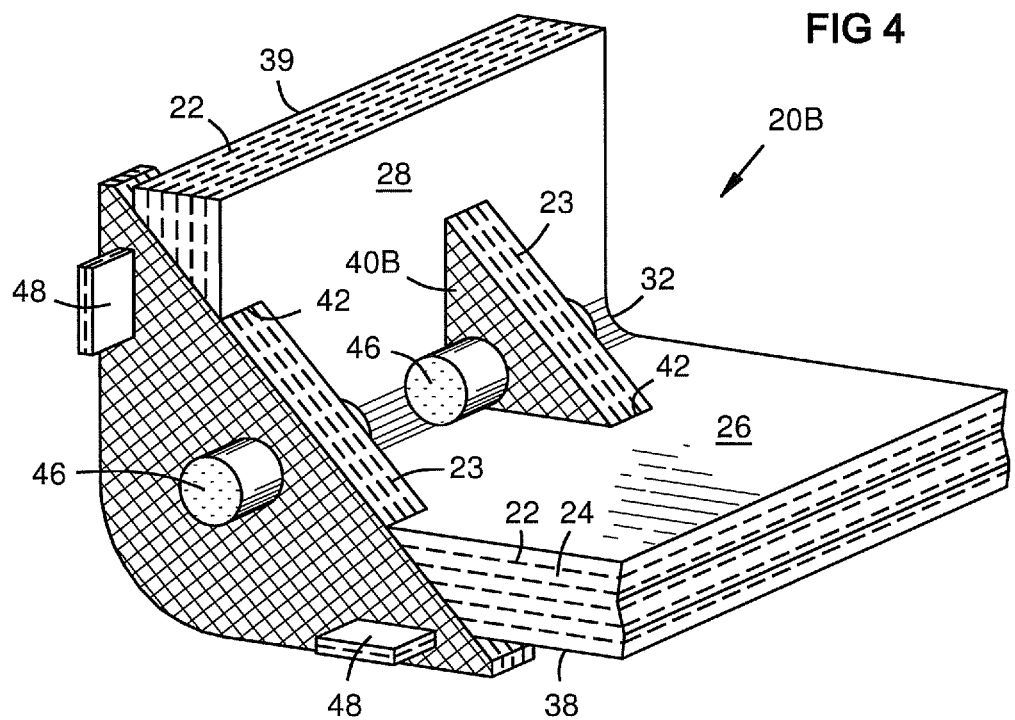
FIG. 4 is a sectional perspective view of CMC structure according to further aspects of the invention.
Figure 5:
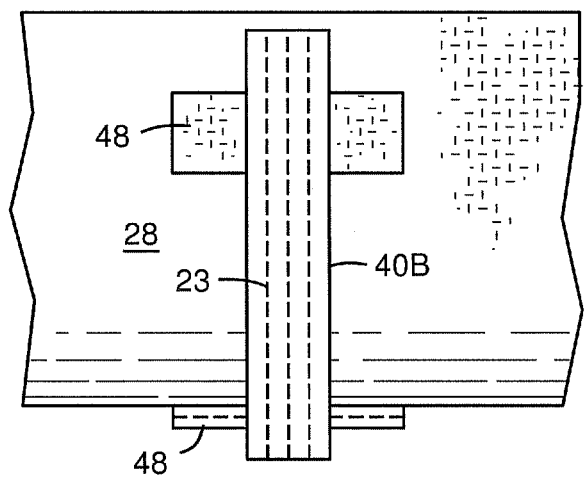
FIG. 5 is a front view of the embodiment of FIG. 4.
Figure 6:
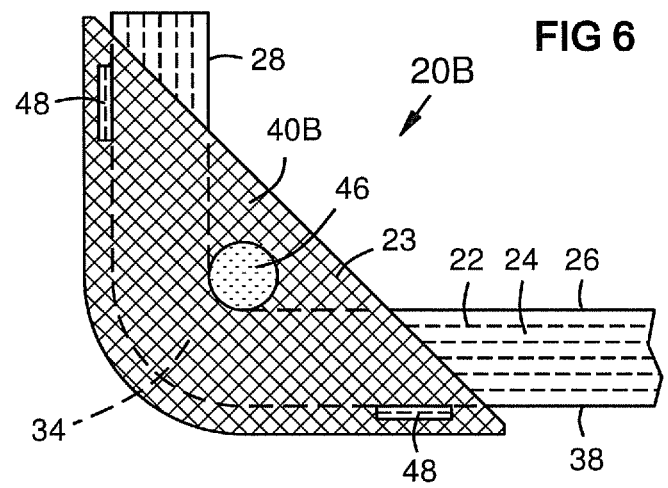
FIG. 6 is a side sectional view of the embodiment of FIG. 4.

FIG. 4 is a perspective sectional view of CMC structure 20B according to further aspects of the invention. It is similar to embodiment 20A with added interlocking features in the form of a pin 46 and tabs 48. These features enhance load transfer between the gusset plate 40B and the walls 26, 28. The tabs 48 may be inserted into the gusset plate 40B or formed thereon either before or after inserting the gusset plate into the slot 42. The pin 46 is inserted after the gusset plate is inserted into the slot. The tabs 48 contact outer surfaces 38, 39 of the first and/or second walls 26, 28, to oppose a wall-spreading moment of bending about the intersection. The size of the interlocking features 46, 48 may be engineered to balance interlaminar shear, in-plane shear, and in-plane tensile strengths of the materials and fiber orientations used for the parts 26, 28, 40B, 46, and 48. FIG. 5 is a front view of the embodiment of FIG. 4. FIG. 6 is a side sectional view of the embodiment of FIG. 4.

In the embodiment of FIGS. 4-6, a green or bisque-fired gusset plate 40B may be inserted into a wall structure 26, 28 that has been fired to a higher temperature, such that upon final firing of the assembly, the gusset plate 40B shrinks more than the wall structure. This tightens the interlocking features 46, 48 against the wall structure 26, 28, providing pre-compression of the plies 22, 24 in the intersection 34.

FIG. 7 illustrates a CMC structure 20C with a gusset plat 40C and pin 46, but without the tabs of FIG. 4. Bending moments M1 that would separate the walls 26, 28 are opposed by the diagonal ridge 50 of the gusset plate contacting the diagonal surfaces of the slot 42, due to its diagonal angle A. The intersection 34 can be considered an origin 35 for relative bending moments between the walls 26, 28. The pin 46 prevents the gusset plate 40C from separating from the slot 42 under the forces M1, and compresses the fillet 32 under such forces.

FIG. 8 illustrates a CMC structure 20D with a gusset plate 40D in a two-part slot 42D, 43D that spans the intersection 34, but does not cut through it. The slot has a first hole 42D in the first wall 26 and a second hole 43D in the second wall 28. The gusset plate may have a tab 52 at one or both ends to interlock against outer surfaces 38, 39 of one or both walls 26, 28.

FIG. 9 illustrates a CMC structure 20H as in FIG. 8 without a tab 52. This embodiment has two diagonal edges 50, 51 on the gusset plate 40H contacting diagonal surfaces of the holes 42D, 43D to oppose both a wall-spreading moment M1 and a wall-closing moment M2 about the intersection 34.

FIGS. 10 and 11 illustrate a CMC structure 20E in which the gusset plate 40E has tabs 56 formed by spreading fibers 23 of the gusset plate at ends of the plate during wet lay-up. The tabs 56 interlock against outer surfaces 38, 39 of one or both walls 26, 28 to oppose the wall-spreading moment M1 previously described. This gusset plate 40E and the tabs 56 thereon may be formed separately from the wall structure 26, 28 and inserted into the slot 40E as previously described. Alternately, the gusset plate 40E may be formed by wet lay-up within the slot 42E, and one or both ends of the gusset plate 40E may be spread against the respective wall 26, 28 to form the tabs 56. A pin 46 may be provided through the gusset plate 20E as previously described.

Figure 12:
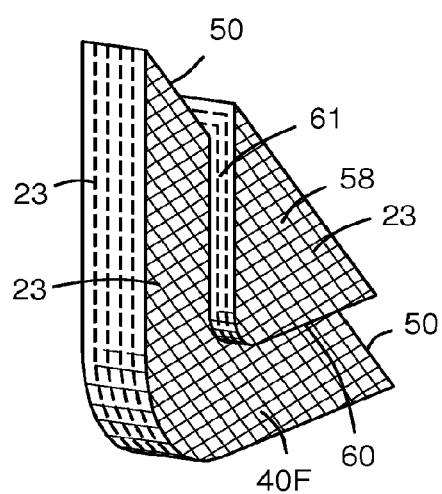
FIG. 12 is a perspective view of a gusset with U-shaped overlay as an interlocking feature.

FIG. 12 shows a U-shaped CMC overlay 58 bonded to a gusset plate 40F that works in slots 42 as in FIGS. 2-4. The overlay 58 widens the portion of the gusset plate spanning between the walls 26, 28 on the inner side of the intersection 34. The overlay 58 has surfaces 60, 61 that contact the inner surfaces of both walls 26, 28 respectively, thus opposing the wall-closing moment M2. The diagonal ridge 50 of the gusset plate 40F contacts diagonal surfaces of the slot 42 to oppose the spreading moment M1 as previously described. Optionally, tabs 48, 52 as previously described can further oppose the wall-spreading moment M1. The U-shaped CMC overlay 58 reinforces the ridge 50 of the gusset plate 40F against buckling, allowing the gusset plate 40F to be thinner for a given strength requirement.

Figure 13:
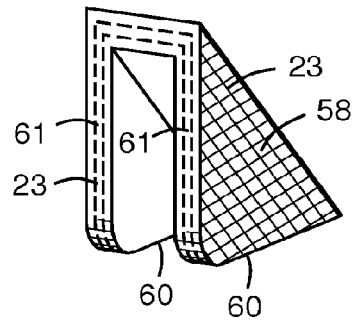
FIG. 13 is a perspective view of the U-shaped overlay of FIG. 12.

FIG. 13 shows the U-shaped CMC overlay 58 of FIG. 12 separately. It can be formed and bisque-fired separately, and then slipped over the gusset plate 40F after insertion of the gusset plate 40F into the slot 42 of the CMC structure. Alternately, the overlay 58 can be wrapped over the ridge 50 of the gusset plate 40F in wet lay-up after insertion of the gusset plate 40F into the slot 42e.

Figure 14:
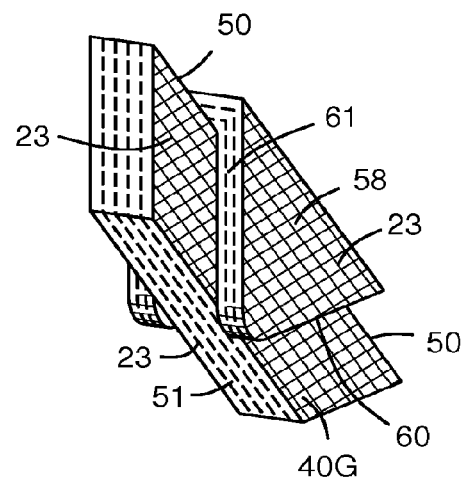
FIG. 14 is a perspective view of a U-shaped overlay on a gusset that does not cut through the wall intersection.

FIG. 14 shows a U-shaped CMC overlay 58 bonded to a gusset plate 40G that works in holes 42D, 43D as in FIG. 9. The gusset plate 40G has first and second diagonal edges 50 and 51 that contact diagonal surfaces of the holes 42D, 43D to oppose both bending moments M1 and M2. This gusset plate 40G spans the intersection 34 without cutting it, as previously described. This embodiment has advantages of both FIGS. 9 and 12. It opposes wall-separating and wall-closing moments, does not cut the intersection 34, and may be flush with the outer surfaces 38, 39 of the walls 26, 28.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A ceramic matrix composite (CMC) structure comprising:
   first and second CMC walls joined at an intersection, the walls comprising fibers; and
   a gusset plate spanning between the two walls;
   wherein the gusset plate is mounted in a slot comprising diagonal surfaces extending through both walls in the CMC structure at an angle of 30-60 degrees with respect to each wall;
   wherein the gusset plate comprises fibers oriented to provide anisotropic strengthening to the intersection, and are discontinuous with the fibers of the walls.

2. A ceramic matrix composite (CMC) structure according to claim 1, wherein at least some of the fibers of the gusset plate are oriented diagonally to the two walls, and oppose in tension a wall-spreading moment of bending of the two walls about the intersection.

3. A ceramic matrix composite (CMC) structure according to claim 1, wherein the gusset plate comprises a first interlocking feature that contacts at least one of the walls to oppose a wall-spreading moment of bending of the two walls about the intersection.

4. A ceramic matrix composite (CMC) structure according to claim 3, wherein the first interlocking feature comprises a diagonal ridge on the gusset plate contacting a matching diagonal surface of the slot.

5. A ceramic matrix composite (CMC) structure according to claim 3, wherein the gusset plate comprises a second interlocking feature that contacts at least one of the walls to oppose a wall-closing moment of bending of the two walls about the intersection.

6. A ceramic matrix composite (CMC) structure according to claim 5, wherein the second interlocking feature comprises a U-shaped CMC overlay that covers and widens a spanning portion of the gusset plate between the walls, and wherein the CMC overlay contacts inner surfaces of the first and the second CMC walls.

7. A ceramic matrix composite (CMC) structure according to claim 1, wherein at least some of the wall fibers are continuous between the two walls.

8. A ceramic matrix composite (CMC) structure according to claim 1, wherein the gusset plate is CMC, and is co-fired with the CMC walls to a final bonded state.

9. A ceramic matrix composite (CMC) structure comprising:
   first and second CMC walls joined at an intersection, wherein the walls comprise fibers; and
   a CMC gusset plate spanning across the intersection and oriented substantially orthogonally to the two walls;
   wherein the gusset plate is mounted in a slot which extends through the intersection comprising a diagonal surface in each of the two walls of the CMC structure, the gusset plate comprising a diagonal ridge that contacts the diagonal surfaces of the slot;
   wherein the diagonal surfaces are oriented at an angle between 30-60 degrees with respect to each of the two walls;
   wherein the gusset plate comprises fibers oriented diagonally; and wherein the fibers of the gusset plate are discontinuous with the fibers of the walls.

10. A ceramic matrix composite (CMC) structure according to claim 9, wherein the gusset plate comprises interlocking features that contact the walls to oppose moments of bending of the walls about the intersection.

11. A ceramic matrix composite (CMC) structure according to claim 10, wherein the interlocking features comprise the diagonal ridge on the gusset plate contacting the diagonal surfaces of the slot in opposition to a wall-spreading moment of the two walls, and a U-shaped CMC overlay bonded to the gusset plate that widens the gusset plate between the walls, and that contacts inner surfaces of both the first and the second wall in opposition to a wall closing moment thereof.

12. A ceramic matrix composite (CMC) structure according to claim 9, wherein at least some the wall fibers are continuous between the two walls.

13. A ceramic matrix composite (CMC) structure according to claim 9, wherein the gusset plate is co-fired with the CMC walls to a final bonded state.

* * * * *